UNITED STATES PATENT OFFICE.

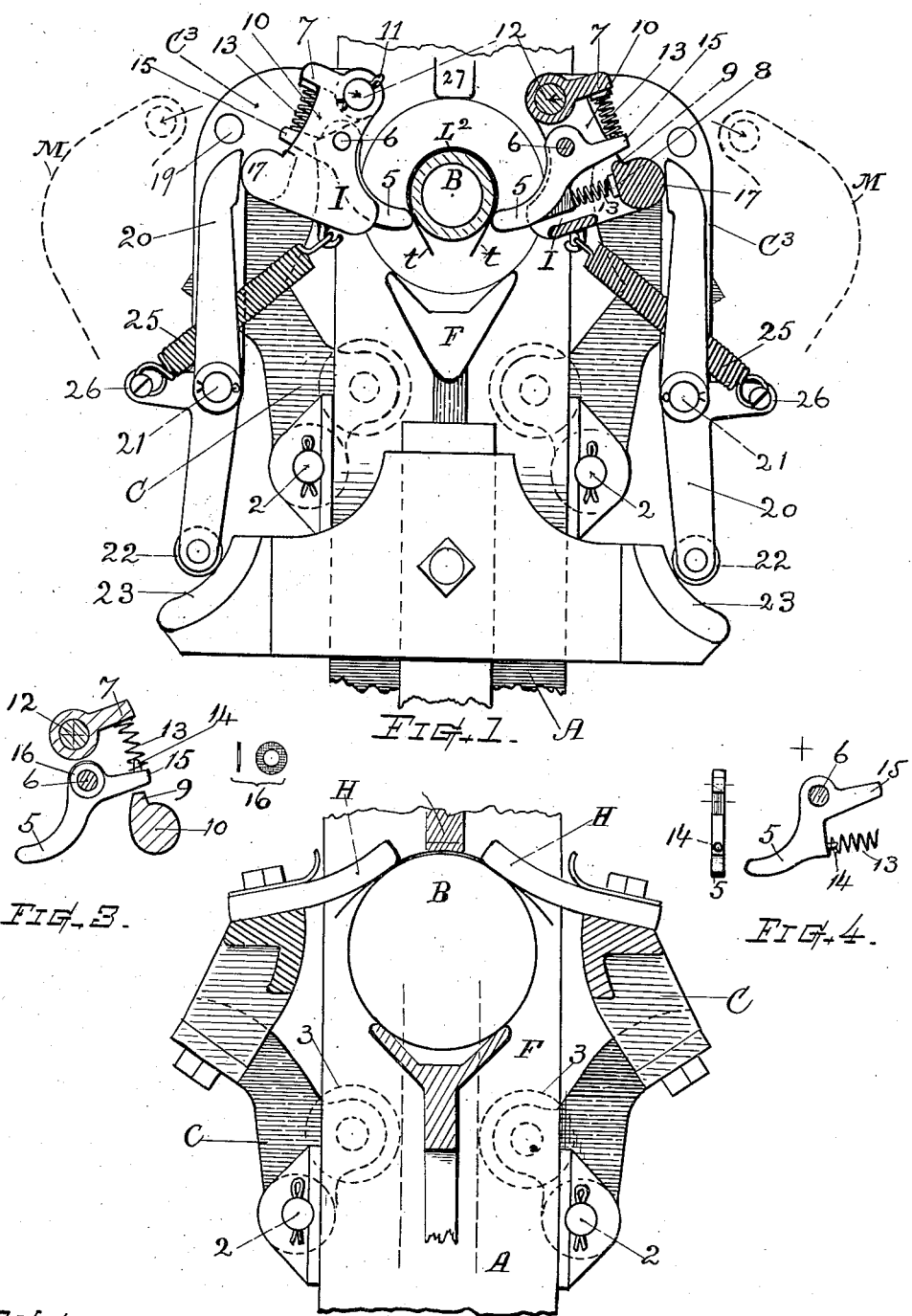

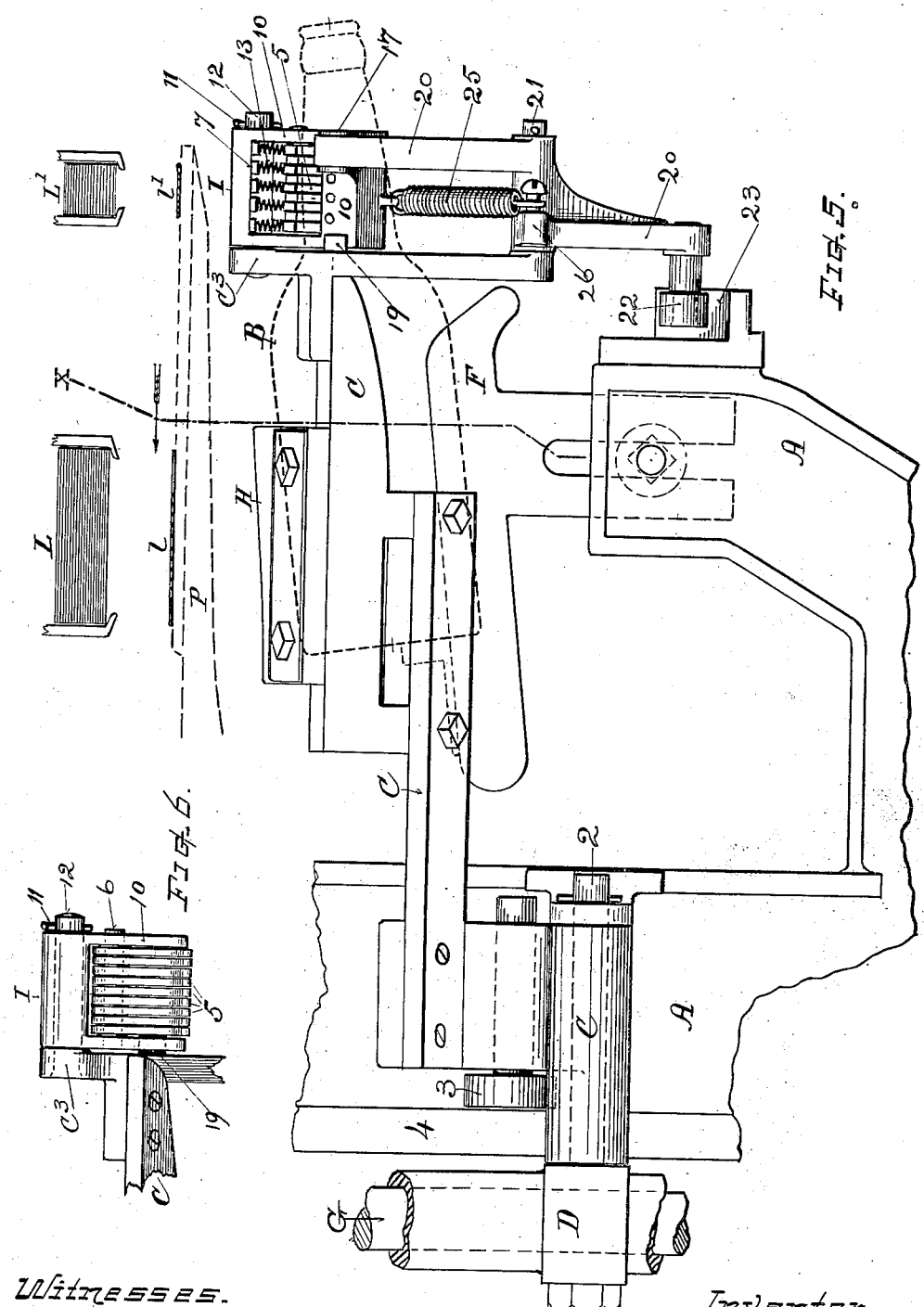

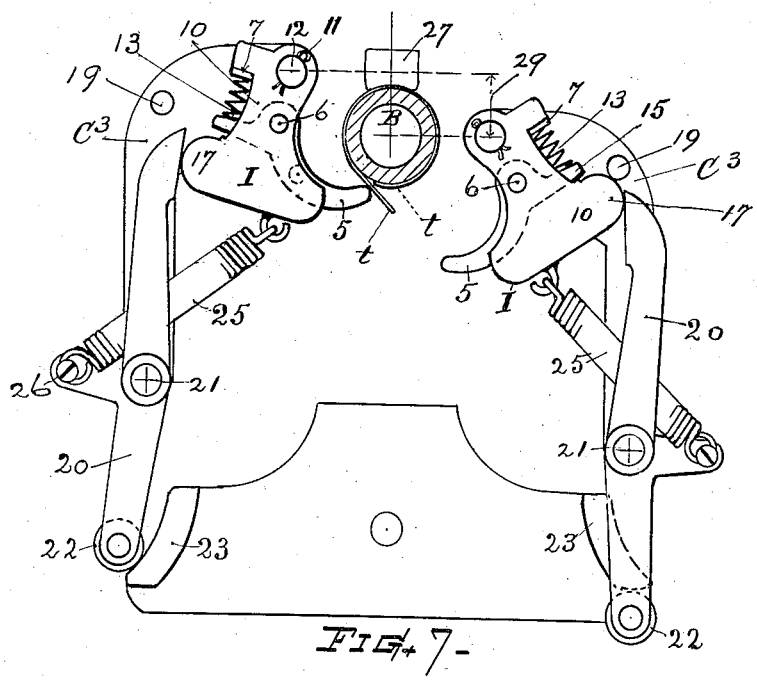
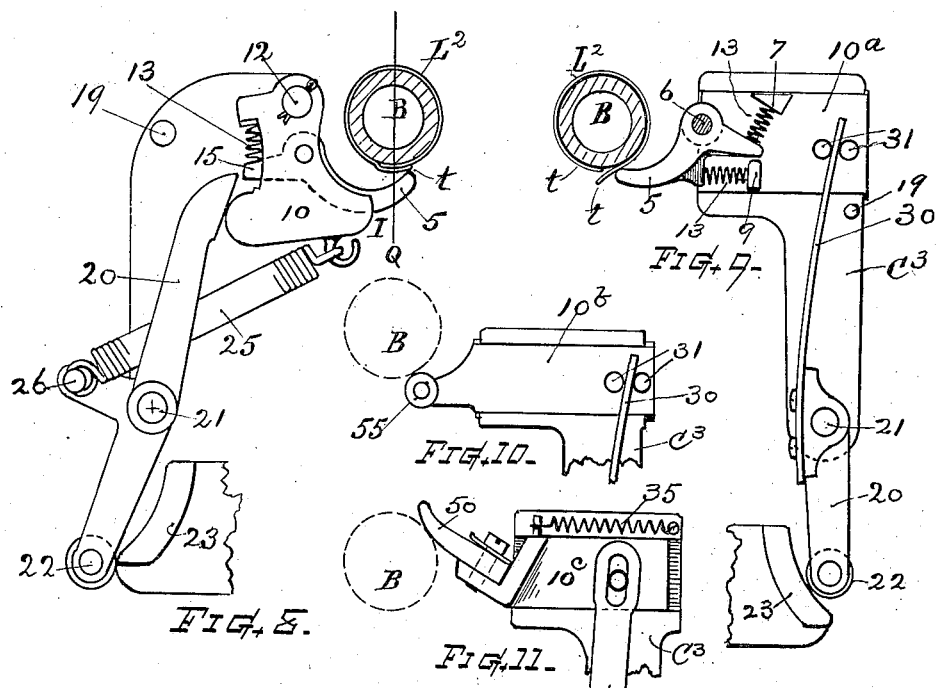

FRANK O. WOODLAND, OF WORCESTER, MASSACHUSETTS.

WIPER MECHANISM FOR LABELING-MACHINES.

No. 918,242.    Specification of Letters Patent.    Patented April 13, 1909.

Application filed June 18, 1906. Serial No. 322,196.

*To all whom it may concern:*

Be it known that I, FRANK O. WOODLAND, a citizen of the United States, residing at Worcester, in the county of Worcester and State of Massachusetts, have invented a new and useful Wiper Mechanism for Labeling-Machines, of which the following is a specification, reference being made therein to the accompanying drawings.
The object of my present invention is to provide a practical and efficient wiper mechanism for use in labeling machines, more especially designed for dual labeling, for the application of neck-labels simultaneously with the body labels.

Another object is to provide a wiper means for labeling machines, adapted for laying labels upon varying or curved surfaces, and operative for pressing the ends of a label beneath or around the under side of the bottle, or bottle-neck, by an undertucking movement in addition to the regular wiping movement, as more fully hereinafter explained.

Other objects and novel features of my invention are set forth in detail in the following description, and the particular subject matter claimed defined in the summary.

In the drawings, Figure 1 represents a front view of wiper mechanism embodying my invention, one of the wiper heads being shown in section. Fig. 2 represents a transverse vertical section at line X on Fig. 5, showing portions of mechanism that are in rear of those exhibited in Fig. 1. Fig. 3 is a diagrammatic view of one of the finger-plates or wiper-face members and adjacent parts. Fig. 4 shows the back and side form of another one of the fingers or wiper-face members. Fig. 5 represents a side view of wiper mechanism with the wipers arranged for dual labeling, also indicating the relation thereto of the label-holder and picker devices. Fig. 6 represents the face of one of the undertucking wipers. Fig. 7 is a front view of my wiper mechanism as arranged with the wipers working at different levels for underlapping the ends of labels that extend more than the circumference of the bottle-neck or article to which the labels are affixed. Fig. 8 is a front view illustrating the operation in which the wiper has a degree of undertucking movement that carries the face of the wiping member laterally beyond the central plane of the bottle. Figs. 9, 10 and 11 illustrate modifications wherein the wiper-head is arranged to slide instead of swing upon a pivot axis.

The improved mechanism illustrated is more especially designed for use in connection with pickers, label-delivering devices and operating mechanisms similar in general character to that described in my prior application for patent, Serial No. 197,485, but the invention may be employed in labeling machines of other construction; and I do not, therefore, confine my present invention to a particular form of machine upon which to apply the improvements.

Referring to the drawings, the part indicated by the letter A represents a portion of a suitable main frame, and D a reciprocating slide that is moved up and down upon the guide G (by any suitable means) carrying the wiper-arms C past the object to be labeled. In practice the wiper-arms have an upward and downward movement and a lateral or swinging action on the centers 2, so that the opposite wipers are closed together when they move downward past the bottle B, which in supported in well known manner by the stationary bottle-rest F, and are then opened or swung apart so as to clear the bottle when they move upward; such movements being imparted to the wiper-arms by means of guides 4 and rollers 3 heretofore employed; or by any suitable means for effecting similar movement.

I indicates my undertucking wiper which is supported in connection with the wiper-arm, preferably by a supplemental bracket or hanger $C^3$ formed upon or attached to the wiper-arm C at or near the outer end thereof and adapted for wiping on neck labels, and H indicates an ordinary flexible-pad wiper fixed upon the wiper-arm at position for wiping on the body labels.

L and $L^1$ indicate the label supply packs sustained by any suitable label-holder; and $l$ and $l^1$ indicate the labels as severally delivered by the pasting pickers P (indicated by dotted lines, on Fig. 5.)

In accordance with my invention, as shown in Figs. 1 to 8, the wipers I each comprise a gang or series of pivoted inwardly curved fingers or members 5 forming the working face of the wiper and supported on a pivoting axis or pin 6 mounted in a swinging head-piece 10 carried upon the wiper-arm, or its supplemental bracket C³, by a pivoting stud, shaft or axle 12 fixed therein, upon which the wiper-head 10 is supported to swing, preferably in pendulous manner back and forth, in lateral relation to the position of the bottle rest. The wiper-head is provided with seat lugs 7 and 8, and each individual wiper-finger is provided with an expanding tensioned spring 13 suitably arranged between an offset portion of the finger and one of said seat lugs, for normally projecting the wiping face. The finger-piece 5 is best provided with a stud 14 for confining the end of the spring in connection therewith.

The wiping-face members or fingers 5 may be made of plate brass or other suitable material that can be assembled to work in gang. The alternate members are preferably modified in form, some being as shown in Fig. 3 and the others as shown in Fig. 4, so that their springs 13 are respectively disposed alternately at offset positions, as for instance in upright and horizontal positions, to bear against the seat members 7 and 8 respectively; thus affording ample room for each spring to work without interference.

Each member is provided with a projection, lug, or arm 15 that contacts with a stop or lug 9 for limiting the forward movement of the member by its spring, and bringing all of the members to a normal alinement at the face of the wiper. The springs afford a yielding pressure independent for each individual member or finger in the gang or series; thus producing a wiper-face composed of independently yieldable parts or members.

The finger members 5 are preferably arranged on their pivot-pin 6 with thin washers 16 between the adjacent members, although such washers may not in all instances be employed.

Combined with each of the laterally swinging or movable wiper-heads I provide means for independently moving the same in relation to the wiper-carrying arms. Such means in the present instance consists of a lever 20 fulcrumed at 21 upon the bracket C³. The upper end of said lever bears against a suitable boss or surface 17 of the wiper-head 10, while its lower end is provided with a stud and roller 22 that moves into contact with a cam or pattern-surfaced member 23, supported on the frame A, for actuating the lever 20 when the wiper-arms move downward. A contractile spring 25 connects the lower part of each wiper-head with a projection 26 upon the lever 20. Said spring serves to swing the wiper-head outward in relation to the support bracket, and also to keep the upper end of the lever normally in contact with the boss or surface of the wiper-head.

The oppositely disposed wipers and wiper-operating devices are of similar construction, but made right and left in pairs. The description of one of the pair will therefore apply to both; similar reference characters designate corresponding parts in the right and left positions.

The outward movement of the wiper-head is arrested and limited by a suitable back-stop device or lug 19 fixed on the support bracket C³. The wiper-head 10 is confined on its pivot 12 by a cotter-pin or similar fastening 11, which permits of the wiper-head being readily taken off the machine and washed out in case the members become clogged with glue.

The drawing, Figs. 1 and 2, illustrates the position of the mechanism as in action at an intermediate stage of the wiping-on movement; the wipers having commenced but not completed their action. In the operation, the labels having been primarily glued and delivered in well known manner above the bottle and there centrally clamped by a suitable grip device 27, the wipers are brought together above the label and then moved downward. The set of wipers H lays the body-label and the set of wipers I lays the neck-label simultaneously. At the first part of the movement the under side of the wiper-face members 5 press down the label L² upon the upper curvature of the bottle; the lever 20 being meanwhile free from the cams 23 and the wipers are yieldingly influenced only by the springs 25; the members 5 being pressed by the spring 13 so that their ends 15 are against the limiting stops 9. At about the time the ends of the wiping members reach the sides or median curvature on the bottle, the lower ends of the levers 20, or their rolls 22, strike the cams 23 and the further downward movement causes the levers to swing and press the wiper-heads 10 toward each other, carrying the ends of the inwardly curved fingers or members 5 beneath the neck of the bottle with a tuck-under movement that wraps the ends t (see Fig. 1) of the label about the under curvature, and presses them against the surface with a yielding pressure due to the tension of the springs 13. The separate wiping-members 5 permit conformation of the wiper-face to the longitudinal curvature or irregularities of surface, so that a label can be properly wiped on when laid more or less upon the arched shoulder of the bottle. When the rollers 22 have passed the cams 23 the levers 20 and wiper-heads 10 are relieved and can assume normal positions, and the rollers 22 can pass up at the inner side of the cams without effecting any operation of the mechanisms.

When the wipers have performed their wiping-on action, an opening operation of the wiper-arms C swings back the support-brackets, together with the wiper-heads pivoted thereon, to the positions approximately indicated by dotted lines M on Fig. 1, and the wipers move upward to their primal position without interference with the bottle.

In practice, when the mechanism is desired to affix labels which are of greater length than the circumference of the neck and are required to be lapped at their ends, the wipers I at the right and left hand positions are arranged at different levels, as illustrated in Fig. 7; the lead 29 being about one inch, more or less, in a full sized machine. The same amount of lead is of course assumed by the levers 20 and their rolls 22 in approaching the cams 23. This difference in levels enables one wiper to act in advance of the other and to complete the wiping-on of one end of the label, and to get out of the way by its retractive action, (see positions Fig. 7) before the opposite wiper completes its action; thereby causing the second end of the label to be lapped over and laid upon the first laid end of the label, by the consecutive undertucking movements of the respective wipers. Also, enabling the extremities of the wiper-face members 5 to be projected laterally beyond the central axial plane Q, of the bottle neck as illustrated in Fig. 8, for firmly wiping on the extreme over-lapping outer end of the label.

In Fig. 9 I have illustrated a modification wherein the movable wiper-head is made as a laterally shiftable slide 10$^a$ working in guides on the bracket C$^3$, instead of a pivoted or swinging construction. The actuating lever 20 is also shown as made with a spring-arm 30, engaging with lugs or pins 31 fixed on the slide, for moving the wiper devices toward the central plane. The yieldable wiper-face members 5, their pivot-axis 6 and springs 13 are arranged for operation substantially as first above described.

In Fig. 10 there is illustrated a modification in which a roller 55 is employed as a wiping-face member; the wiper-head being shown as a slide 10$^b$, and the actuating lever 30 arranged similar to Fig. 9.

In Fig. 11 there is shown a modification in which the wiping-face member is constructed as a pad or tongue 50 of rubber or similar semi-flexible substance; the wiper-head being made as a slide 10$^c$ with a socket or flange for supporting the pad. In this construction the flexible end of the tongue 50 wipes beneath the under curve of the bottle neck as the slide is projected forward by the action of the lever 20 and cam 23 as above noted. A spring 35 is arranged for retracting the slide 10$^c$.

By combining with a set of body-label wipers H rigidly fixed to the wiper-carrier arms, a set of neck-label wipers arranged upon and laterally movable in connection with said arms, the mechanism is rendered capable of the simultaneous affixment of dual labels, and the handling of neck labels of various styles and degrees of extension, and at the same time performing the wiping operations in a highly efficient manner.

I claim and desire to secure by Letters Patent—

1. A label-wiper having its wiping face composed of a gang of pivoted independently yieldable fingers.

2. A label-wiper for the purpose set forth, comprising a yieldably supported wiper-head, and having its wiping face composed of a gang of independently yieldable members movably supported within said wiper-head.

3. A label-wiper for the purpose set forth, comprising a yieldably supported wiper-head, and having its wiping face composed of a gang of independently yieldable members movably supported within said wiper-head, means for limiting the projection of said face members to a position of normal alinement with each other in relation to the wiper-head, and means for moving the wiper-head in relation to its supporting carrier.

4. A label-wiper comprising a swinging wiper-head pivotally supported in connection with a wiper-carrying arm, and having a wiping face composed of a gang of independently yieldable members pivotally mounted within said wiper-head with their ends forwardly curved to pass under a bottle neck, a separate presser spring for each face member, means for limiting the projection of the members from the wiper-head, and means for swinging the wiper-head to effect a tuck-under movement of the wiper as the wipers approach the ends of the label.

5. In a bottle labeling machine, label wipers each comprising a plurality of individually spring-pressed wiping members grouped in an adjacently disposed gang or series, movable gang-supporting devices having the respective gangs of members and their springs mounted thereon, said gang-supporting devices adapted to afford a tuck-under movement, and actuating means independently controlling said gang-supporting devices for moving the gangs of wiping members beneath the curve of the bottle as they are respectively carried past the central diametric plane of the bottle.

6. In a bottle labeling machine, a pair of wipers each comprising a pendulous swinging wiper-head having a series of wiping-face members pivoted therein, springs for individually pressing said members toward the work, and means for swinging the wiper-heads toward each other as they pass below the swell of the bottle.

7. In a bottle labeling machine, a pair of wipers each comprising a pivoted wiper-head carrying a plurality of downward and inwardly curved wiping members pivotally supported in said wiper-head, presser springs for the several wiping members, reciprocating supports for carrying said wiper-heads, springs for normally retracting the wiper-heads, actuating levers for swinging the wiper-heads, and cam members controlling said levers.

8. In a labeling machine, a pair of wipers comprising opposite laterally movable wiper-heads each carrying a plurality of inwardly curved, independently yieldable spring-pressed wiping members, means for independently moving said wiper-heads laterally toward and from the bottle, the respective sets of wiping-members arranged to act at different levels to wipe-on one end of a label in advance of the wiping-on of the other end of said label, and the main wiper-carrying arms having said wiper-heads supported thereon.

9. In a labeling machine, a pair of under-tucking wipers each comprising a gang of inwardly projecting individually yieldable finger members, their inner ends projectable beneath the under curve of the bottle and adapted for wiping-on one end of a label in advance of the other; in combination with a grip-device for centrally clamping the label, a pair of reciprocating rocking arms for actuating the wipers to pass the bottle, and means for independently imparting an under-tuck movement to the respective wipers.

10. In a labeling machine, in combination with wiper-carrying means having the body-label wipers carried thereon, a bottle rest, and mechanism for causing the wipers to pass a bottle carried by said rest; of a pair of movable wiper-heads mounted on the respective wiper-carrying arms at different levels in relation to each other, opposite gangs of wiping members yieldably mounted in said wiper-heads, means for projecting the respective wiping members individually, and means for moving the wiper-heads to successively impart an under-tuck movement to the respective wiper-heads and wiping members.

11. A label-wiping mechanism comprising a movable wiper-head, having a plurality of independently yieldably projecting wiping-face members mounted therein, means for advancing said wiper-head past the object to be labeled, and means for transversely moving the wiper-head to project the extremity of the wiping-face members laterally past the central axial plane beneath the object labeled, for the purpose set forth.

12. In a labeling machine, the combination with a pair of reciprocating wiper-carrying arms; of a set of flexible-pad wipers fixed on said arms, a wiper-supporting bracket attached to the end of each wiper-carrying arm, a second set of wipers pivotally carried in said brackets and comprising movable wiper-heads provided with gangs of individually-pivoted spring-pressed wiping-members having projecting finger-like portions that contact with the labels.

13. In a labeling machine, the combination with reciprocating laterally rockable wiper-carrying arms, of a set of wipers fixed upon said arms, a second set of wipers comprising wiper-heads movably supported in connection with said arms and having under-projecting wiping-face-members carried on said wiper-heads, and means for effecting indedendent movement of the respective wiper-heads in relation to the arms.

14. In a label-wiping mechanism, a wiper comprising a head-frame having a gang of thin parallel wiper-plates or fingers pivotally mounted therein with projecting wiping points or face members, and presser springs for the individual fingers, the said fingers being arranged with their springs disposed in alternately differently directed positions, substantially as set forth.

15. In a label affixing mechanism, in combination with wiper-carrying arms adapted to pass the object to which the labels are applied, means for delivering a plurality of labels, body-label wipers carried upon said arms, neck-label wipers pivotally mounted in supplemental supporters on said arms, and each comprising a plurality of spring-pressed inwardly curved wiping-face members, means for swinging said neck-label wipers inward to effect a tuck-under action, and means for retracting said supplemental supporters to normal position in relation to the carrying arms.

16. In a labeling machine, in combination, a pair of wipers having their working faces formed as downward inwardly-curved projecting members adapted for projection beneath the under curvature of the bottle, a grip device for clamping the label, and means for imparting a tuck-under movement to said wipers.

17. In a label-wiping mechanism, in combination with wiper-carrying means, a laterally movable wiper having a forwardly projecting downwardly and inwardly curved contact member adapted to extend under the neck of a bottle, means for yieldingly sustaining said contact member at extended position in relation to the wiper-body, and an actuating means for imparting a tuck-under movement to said wiper-body.

18. In a labeling machine, in combination, a stationary bottle rest, a reciprocating wiper-slide, laterally rocking wiper-arms carried upon said slide, means for controlling said arms to pass the bottle rest in closed relation, flexible body-wipers fixed on said arms, supplemental brackets carried on said wiper-arms, neck-wipers each comprising a swinging wiper-head provided with a gang of inwardly curved members supported therein, with presser springs for said members, limiting stops for said members, a back-stop for said wiper-heads, actuating levers fulcrumed on said brackets and engaging with said wiper-head; springs connecting the wiper-head and lever, and lever-actuating surfaces against which said levers contact by the slide movement, substantially as set forth.

Witness my hand this 15th day of June, 1906.

FRANK O. WOODLAND.

Witnesses:
 CHAS. H. BURLEIGH,
 ELLA P. BLENUS.